(12) United States Patent
Thomas et al.

(10) Patent No.: US 10,382,329 B1
(45) Date of Patent: Aug. 13, 2019

(54) SOURCE MAC ACCESS CONTROLS IN A VIRTUAL REDUNDANT ROUTER PROTOCOL ENVIRONMENT

(71) Applicant: Juniper Networks, Inc., Sunnyvale, CA (US)

(72) Inventors: Reji Thomas, Bangalore (IN); Sandip Kumar Ghosh, Bangalore (IN); Jimmy Jose, Hosur (IN)

(73) Assignee: Juniper Networks, Inc., Sunnyvale, CA (US)

( * ) Notice: Subject to any disclaimer, the term of this patent is extended or adjusted under 35 U.S.C. 154(b) by 62 days.

(21) Appl. No.: 15/281,976

(22) Filed: Sep. 30, 2016

(51) Int. Cl.
*H04L 12/713* (2013.01)
*H04L 12/745* (2013.01)
*H04L 29/12* (2006.01)

(52) U.S. Cl.
CPC .......... *H04L 45/586* (2013.01); *H04L 45/748* (2013.01); *H04L 61/103* (2013.01); *H04L 61/2007* (2013.01); *H04L 61/6022* (2013.01)

(58) Field of Classification Search
CPC ......... H04L 29/12018; H04L 29/12028; H04L 45/586; H04L 61/10; H04L 61/103; H04L 61/106

See application file for complete search history.

(56) References Cited

U.S. PATENT DOCUMENTS

| | | | |
|---|---|---|---|
| 8,014,409 B1* | 9/2011 | Pan | H04L 45/586 370/221 |
| 2008/0151882 A1* | 6/2008 | Sanjay | H04L 45/00 370/389 |
| 2013/0135989 A1* | 5/2013 | Zheng | H04L 41/0654 370/219 |
| 2017/0257313 A1* | 9/2017 | Helen | H04L 45/586 |

OTHER PUBLICATIONS

Nadas, "Virtual Router Redundancy Protocol (VRRP) Version 3 for IPv4 and IPv6," RFC 5798, Internet Engineering Task Force (IETF), Mar. 2010, 40 pp.

* cited by examiner

*Primary Examiner* — Pao Sinkantarakorn
(74) *Attorney, Agent, or Firm* — Shumaker & Sieffert, P.A.

(57) ABSTRACT

In general, techniques provide a mapping of host devices to different virtual router identifiers used to identify the source MAC address used for forwarding packets to the participating host devices. For example, a method may include receiving an Address Resolution Protocol (ARP) request for a first Internet protocol (IP) address from a host device, the first IP address comprising a virtual IP address of the virtual router. The method may also include determining a virtual router redundancy protocol (VRRP) virtual router identifier (VRID) associated with the first IP address. The method may further include generating a mapping between the host device and the determined VRID. The method may also include determining a virtual source MAC address of the virtual router based on the mapping and forwarding a second packet to the host device that specifies a virtual source MAC address for the second packet.

18 Claims, 4 Drawing Sheets

SOURCE MAC ACCESS CONTROLS IN A VIRTUAL REDUNDANT ROUTER PROTOCOL ENVIRONMENT

TECHNICAL FIELD

This disclosure relates generally to computer network routers, and more specifically to virtual routers executing according to virtual router redundancy protocol (VRRP).

BACKGROUND

Information is communicated over the Internet using packet switching technology, in which information is broken up into packets of data that are routed from a source to a destination, typically based on a destination Internet Protocol (IP) address. Routers and other machines in the network use routing protocols to ensure that data makes it from the source machine to the intended destination, which is then able to reassemble the packets to form the original information sent, such as an email, a movie, or a web page. Each router in the network maintains a routing table or other data structure, which includes information regarding the available routes to various network destinations. Routers execute routing protocols to dynamically update the routing tables of the routers. In general, a router executes routing protocols to discover information about the network topology around the router. Routing tables often also include metrics such as the distance associated with various routes, such as the number of hops and amount of time needed to communicate with a remote system over a certain network path.

After determining routes through a network, routers select certain routes to reach various destinations. In particular, a control plane of a router may select routes to reach various destinations that have shortest paths and/or lowest costs for reaching the destinations. The control plane then programs one or more forwarding tables of the router to include information indicating "next hops" along the corresponding selected route. The forwarding information of the forwarding tables map network destinations to interfaces of the corresponding router, such that forwarding units of the router can forward packets destined for the network destinations via the corresponding interfaces to reach the next hops.

In some cases, virtual routers, which are executed by one or more physical routers, perform routing and forwarding operations. In a more detailed example, a virtual router redundancy protocol (VRRP) is often used to specify a router group including a master virtual router, and one or more backup virtual routers on a different physical router operable to take over the master virtual router's routing tasks should the master virtual router fail. VRRP provides redundancy to routers within a local area network (LAN). VRRP allows a network to provide alternate router paths for a host without changing the IP address or MAC address with which the host associates its gateway. That is, the default gateway of a participating host is assigned to the virtual router instead of a physical router. A virtual router may be defined by its virtual router identifier (VRID) and IP addresses, and is also associated with a single virtual MAC address. This virtual MAC address may map to the VRRP virtual router ID.

In some cases, an enterprise may use MAC filtering to perform access control to the enterprise's network. MAC addresses can be used to uniquely identify a device in a broadcast domain and hence used to create a "black list" and "white list" to deny and permit access, respectively, to specific devices. These approaches to filtering can be effective in controlling network access in data centers and in closed wireless environments. MAC layer filtering may build access lists based on source or destination addresses in the MAC layer headers in the Ethernet/IEEE 802.3 frame.

SUMMARY

In general, the techniques provide a mapping of host devices to different virtual router identifiers used to identify the source MAC address used for forwarding packets to the participating host devices. For example, routers may provide an operating environment for virtual routers. The virtual routers may implement a Virtual Router Redundancy Protocol (VRRP) to provide dynamic failover of IP addresses from one router to another in the event of a failure. In a VRRP environment, the router may identify a grouping of host devices to the VRRP group identifier from Address Resolution Protocol (ARP) messages sent by host devices to the router. The router may extract a VRRP group identifier from a virtual MAC address corresponding to the virtual IP address contained in the ARP message. The router may use the extracted information to map the host devices to different virtual router identifiers. The router utilizes the mapping to determine the source MAC address used for forwarding packets to the host devices in a VRRP environment.

In one example, a method includes receiving, by a virtual router executing on a physical router, an Address Resolution Protocol (ARP) request for a first Internet protocol (IP) address from a host device, the first IP address comprising a virtual IP address of the virtual router. The method also includes determining, by the virtual router, a virtual router redundancy protocol (VRRP) virtual router identifier (VRID) associated with the first IP address. The method also includes generating, by the virtual router, a mapping between an IP address of the host device and the determined VRID.

In another example, a network device includes a memory. The network device also includes one or more processors operably coupled to the memory, wherein the one or more processors are configured to execute a virtual router to: receive an Address Resolution Protocol (ARP) request for a first Internet protocol (IP) address from a host device, the first IP address comprising a virtual IP address of the virtual router; determine a virtual router redundancy protocol (VRRP) virtual router identifier (VRID) associated with the first IP address; generate a mapping between an IP address of the host device and the determined VRID; and store the mapping in the memory.

In another example, a non-transitory computer-readable storage medium includes instructions for causing at least one programmable processor of a network device to execute a virtual router, wherein the instructions that cause the at least one programmable processor to execute the virtual router comprise instructions that cause the virtual router to: receive an Address Resolution Protocol (ARP) request for a first Internet protocol (IP) address from a host device, the first IP address comprising a virtual IP address of the virtual router; determine a virtual router redundancy protocol (VRRP) virtual router identifier (VRID) associated with the first IP address; and generate a mapping between an IP address of the host device and the determined VRID.

In this way, the techniques provide heuristically classifying host devices to different virtual router identifiers such that routers are able determine the source MAC address used for forwarding packets to the host devices.

The details of one or more aspects of the techniques are set forth in the accompanying drawings and the description below. Other features, objects, and advantages of the techniques of this disclosure will be apparent from the description and drawings, and from the claims.

BRIEF DESCRIPTION OF THE DRAWINGS

Like reference characters denote like elements throughout the figures and text.

DETAILED DESCRIPTION

Figure 1:
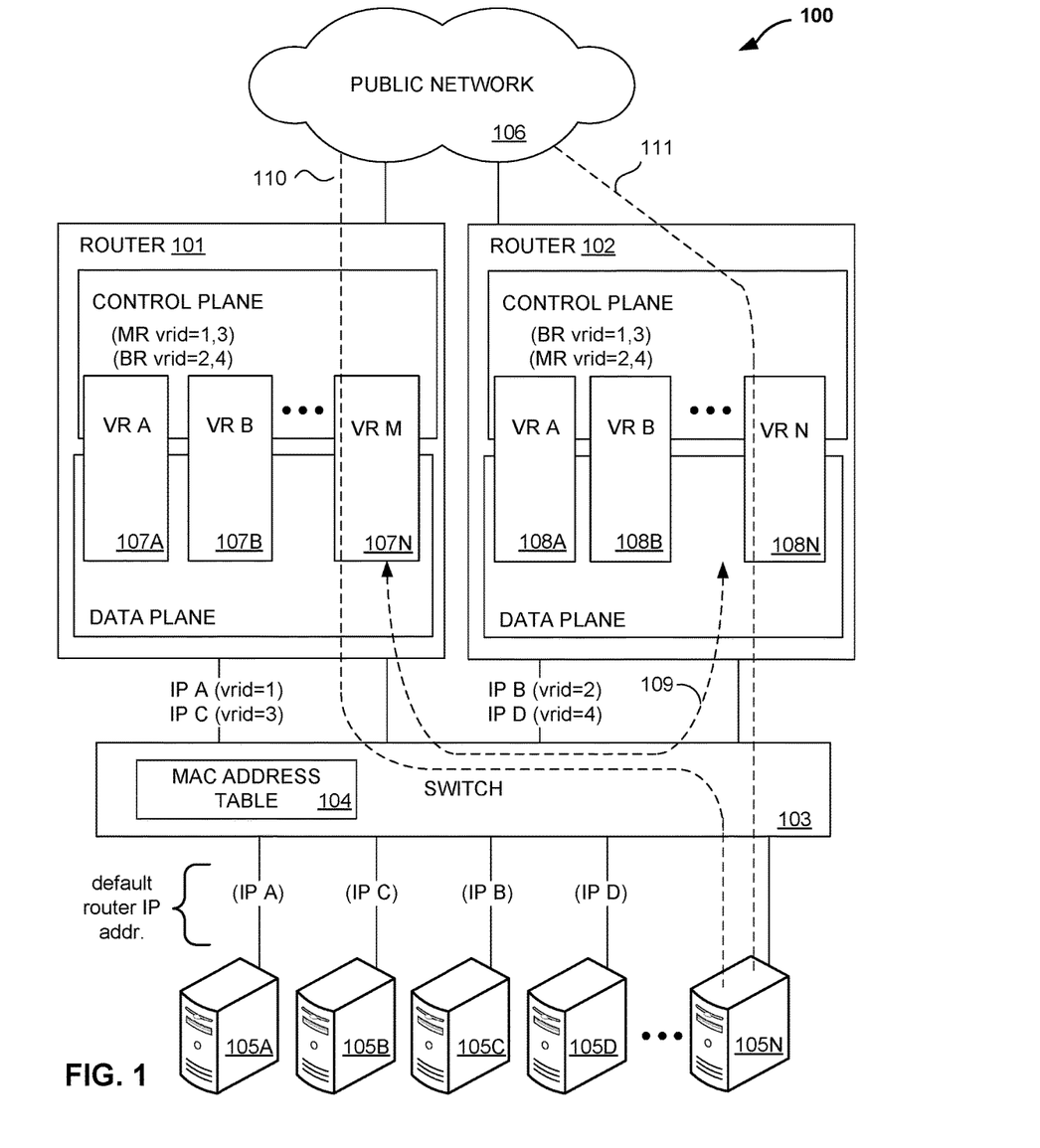
FIG. 1 is a block diagram illustrating an example router network configuration, according to the techniques described herein.

FIG. 1 is a block diagram illustrating an example router network configuration, according to the techniques described herein. In the example of FIG. 1, a first router 101 and a second router 102 operate within network 100, and are coupled by a layer 2 (L2) switch 103. Multiple routers are provided here for purposes such as redundancy, should one of the two routers fail, and for other purposes such as load balancing. The configuration of network 100 illustrated in FIG. 1 is merely an example. For example, a router network configuration may include any number of routers. Nonetheless, for ease of description, only routers 101 and 102 are illustrated in FIG. 1.

Switch 103 provides L2 switching operations for network 100. As shown in FIG. 1, switch 103 is connected by network connections to both routers 101 and 102, and switches data from one device to another on a local area network (LAN). More specifically, switch 103 receives messages from any of network devices such as client devices 105A-105N ("client devices 105" or "hosts 105"), and uses a media access control (MAC) address table 104 to send the messages to desired destination devices by switching the incoming messages to the correct port coupled to the destination device. More particularly, switch 103 learns the MAC address of the connected devices on the local area network, and sends incoming data out the port associated with the MAC address of the destination node.

The routers 101 and 102 are further coupled to a public network 106, such as the Internet, and are operable to route data between client devices 105 and devices on the public network 106.

Routers 101 and 102 may implement an Address Resolution Protocol (ARP) to provide mapping of a MAC address to an IP address. ARP dynamically binds the IP address (the logical address) to a MAC address (the physical or hardware address). A host 105 may broadcast an ARP request with an enclosed IP address to indicate a sender IP address to all devices. Devices typically receive the ARP request and compare their IP address with the enclosed IP address associated with the host. In response to a match of the IP address, the router may send an ARP response including its MAC address to the host. The host may then transmit a packet using the MAC address.

Routers 101 and 102 provide operating environments for one or more virtual routers, shown as 107A-107N and 108A-108N, respectively, which perform various routing and data forwarding functions as though each virtual router were a standalone router. For example, as shown, each of virtual routers 107 and 108 includes a virtual control plane and a virtual data plane, such as virtual routing and forwarding (VRF) components.

Each of virtual routers 107 and 108 may be associated with one another to form a group of redundant routers (e.g., with a common group IP address), each group having a master virtual router and one or more backup virtual routers, where the one or more backup virtual routers track the state of the associated master router in operation so that they are able to take over routing functions for the master virtual router of the group should the master virtual router fail. That is, the backup virtual routers typically do not perform routing functions, but track the state of the master router using a virtual router communications protocol.

In one example, router 101 provides an operating environment for one or more master virtual routers 107, while router 102 provides an operating environment for one or more backup virtual routers 108 that take over in the event that router 101 fails. Similarly, router 102 may provide an operating environment for one or more master virtual routers 108 that are associated with one or more backup virtual routers 107 running on router 101, so that if router 102 fails the virtual routers running thereon are taken over by associated backup virtual routers running on router 101. In general, each master virtual router typically has a different network address (such as a media access control (MAC) address) than the one or more backup virtual routers, and performs the routing functions for the virtual router group. In the example of FIG. 1, router 101 may provide an operating environment for one or more master virtual routers 107 to provide routing functions 110 for the virtual router group to client devices 105. Similarly, router 102 may provide an operating environment for one or more master virtual routers 108 to provide routing functions 111 for the virtual router group to client devices 105.

As shown in the example of FIG. 1, control planes of virtual routers 107 and 108 execute a virtual router communications protocol to establish communication sessions (e.g. communication session 109) between virtual routers for managing each group of redundant routers, including electing and assigning one master router and at least one backup router per router group. The virtual router communications protocol may, for example, provide certain functionality of the virtual router redundancy protocol (VRRP). VRRP may be implemented to provide a default path to a gateway without configuring the dynamic routing or router discovery protocols on client devices. For example, client devices 105 are configured with default gateway IP address of the virtual router group IP address. That is, the VRRP routing platforms share the IP address corresponding to the default route configured on the hosts. In this way, VRRP provides dynamic failover of IP addresses from one router to another in the event of a failure. In a VRRP environment, the master router uses the IP address of the physical interface of the router and forwards packets sent to its IP address. If the master router fails, the backup router with the highest priority becomes the master router and provides uninterrupted service for the host devices. Further examples of VRRP are described in RFC 5798—Virtual Router Redundancy Protocol (VRRP) Version 3 for IPv4 and IPv6, Proposed Standard, dated March 2010, which is incorporated by reference in its entirety.

In a VRRP environment, on a participating host or a server (e.g., client device 105), source MAC filters are configured to allow the corresponding virtual MAC addresses associated with the gateway addresses to be used by the participating host or server. On the router side, the virtual MAC address is used as the source MAC address while forwarding the packets to the corresponding hosts in order to pass the filter. Thus, the virtual MAC address may be referred to as a virtual source MAC address.

A virtual router (e.g., virtual router 107) is configured to use a virtual MAC address which is based on its corresponding Virtual Router IDentifier (VRID) (also referred to as VRRP group identifier), which is different for each virtual router in the network. For example, a virtual router can use a virtual MAC address having the format 00:00:5E:00:01:XX, where the last byte of the address (XX) is the virtual router's VRID. The virtual router assigns the VRRP group identifier to associate all interfaces as a group to provide redundancy for one another. The virtual router may reply with this virtual MAC address when a client device sends an ARP request for the virtual router's IP address.

As a result, a router may host multiple different virtual routers (VRIDs) and their corresponding different virtual MAC addresses. Conventionally, routers may not have any configuration or explicit mapping of which hosts use which virtual IP addresses that the router is hosting. Without the explicit mapping of hosts and virtual IP addresses, routers are unable to determine the virtual MAC address to be used when forwarding the packets to client devices. For example, router 101 may host two separate virtual routers 107A and 107B and may not have an explicit mapping that indicates client device 105B is using a particular virtual MAC address for router 101.

In accordance with the techniques of the disclosure, routers are configured to classify the hosts to different virtual router IDs to establish a mapping that can be used to identify the source MAC address that should be used when forwarding packets to the participating hosts or servers. For example, a router is configured to glean membership information from an ARP request sent by a host to the router. The router may identify ARP requests that are arriving for a particular virtual IP address and gleans the sender IP address from the ARP payload. Because a host may configure its default gateway as one of the virtual IP address of the router, the router may determine a virtual IP address associated with the host, that is, the IP address to which to address packets in order for the packets to be sent to the host.

The router may also extract a VRRP group identifier (an identifier for a group of virtual routers) from the virtual MAC address corresponding to the virtual IP address, which is contained in a target IP address field of the ARP message. Using the above information, the router is able to determine a grouping of hosts-to-VRRP group identifier. The router maintains these group memberships and dynamically updates the information in situations where the group membership changes. The router may then use this information to decide on a source MAC address on a packet that is forwarded to the participating hosts or servers.

In the example of FIG. 1, router 101 may host multiple virtual routers with virtual router IDs 1 and 3 in a master mode (i.e., "MR vrid=1,3") and with virtual IDs 2 and 4 in a backup mode (i.e., "BR vrid=2,4"). Similarly, router 102 may host virtual routers with virtual router IDs 2 and 4 in a master mode (i.e., "MR vrid=2,4") and with virtual router IDs 1 and 3 in a backup mode (i.e., "BR vrid=1,3"). Hosts 105A and 105B are configured to have their default gateway as one of the virtual IP addresses of router 101, namely, IP A and IP C, respectively, and hosts 105C and 105D are configured to have their default gateway as one of the virtual IP addresses of router 102, namely IP B and IP D, respectively.

In operation, when host 105A sends out an ARP request for IP A, the request is received by both routers 101 and 102. Routers 101 and 102 may extract the VRRP group ID (VRID 1) from the virtual MAC address corresponding to the target address (i.e., IP A) and map host 105A to group ID 1. Once the ARP requests are processed, routers 101 (and 102) may have the host-to-group mapping formed (i.e., group ID 1→host 105A; group ID 3→host 105B; group ID 2→host 105C; group ID 4→host 105D), which can be used for inserting the proper source MAC address in the packets forwarded to the hosts. On routers with separate forwarding planes, the "nexthop" of the route pointing to a host address can be programmed with the source MAC address based on a group's membership which could be used for forwarding the packets with appropriate MAC addresses. For example, when a virtual router 107, 108 receives a packet to be forwarded to a host 105, the router determines the virtual source MAC address to be specified in the source MAC address field of the packet header based on the mapping. That is, the mapping can allow a router to encapsulate and send packets with the correct source MAC address that will be properly filtered by access control lists. Accordingly, firewall or switches that sit between the hosts 105 and routers 101, 102 can be configured to have Layer 2 (L2) access control lists as allowing packets with particular source MAC addresses as virtual MAC addresses for access control.

Figure 2:
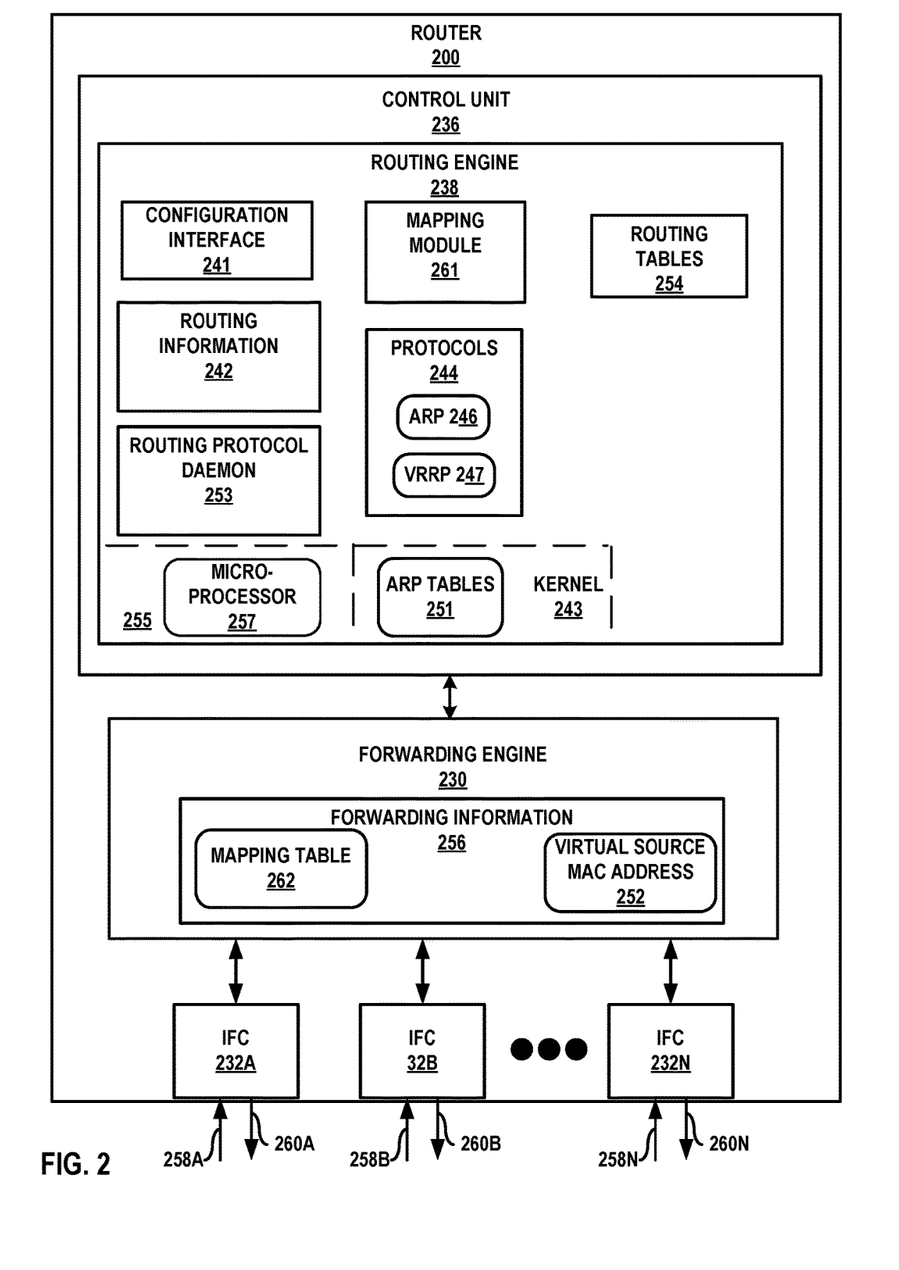
FIG. 2 is a block diagram illustrating an example router, according to the techniques described herein.

FIG. 2 is a block diagram illustrating an example router according to techniques described herein. Router 200 is an example of router 101 of FIG. 1, but may be any router. Router 200 includes a control unit 236 having a routing engine 238, and control unit 236 is coupled to forwarding engine 230. Forwarding engine 230 is associated with one or more interface cards 232A-232N ("IFCs 232") that receive packets via inbound links 258A-258N ("inbound links 258") and send packets via outbound links 260A-260N ("outbound links 260"). IFCs 232 are typically coupled to links 258, 260 via a number of interface ports (not shown). Inbound links 258 and outbound links 260 may represent physical interfaces, logical interfaces, or some combination thereof.

Elements of control unit 236 and forwarding engine 230 may be implemented solely in software, or hardware, or may be implemented as combinations of software, hardware, or firmware. For example, control unit 236 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 236 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE device 200, e.g., protocols, processes, and modules. Control unit 236, in some examples, retrieves and executes the instructions from memory for these aspects.

Routing engine 238 includes kernel 243, which provides a run-time operating environment for user-level processes. Kernel 243 may represent, for example, a UNIX operating system derivative such as Linux or Berkeley Software Distribution (BSD). Kernel 243 offers libraries and drivers by which user-level processes may interact with the underlying system. Kernel 243 supports other software elements including elements executing as part of one or more virtual routers. For example, kernel 243 supports router management functions such as a routing protocol daemon 253 that is operable to perform tasks such as managing routing tables 254 by updating the routing table with newly learned routes, and providing forwarding information 256 for forwarding packets.

Hardware environment 255 of routing engine 238 includes microprocessor 257 that executes program instructions loaded into a main memory (not shown in FIG. 2) from a storage device (also not shown in FIG. 2) in order to execute the software stack, including both kernel 243 and processes executing on the operating environment provided by kernel 243. Microprocessor 257 may represent one or more general or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

Kernel 243 provides an operating environment that executes various protocols 244 at different layers of a network stack, including protocols for implementing Address Resolution Protocol (ARP) 246 and Virtual Router Redundancy Protocol (VRRP) 247. For example, routing engine 238 implements ARP 246 that operates at a link layer of the network stack to process ARP requests. Routing engine 238 also implements VRRP 247 that specifies an election protocol that dynamically assigns responsibility for a virtual router to one of the VRRP routers on a LAN. Although illustrated with ARP 246 and VRRP 247, routing engine 238 may include other protocols not shown in FIG. 2.

Routing engine 238 is responsible for the maintenance of routing information 242 to reflect the current topology of a network and other network entities to which router 200 is connected. In particular, routing engine 238 may update routing information 242 to reflect the current topology of the network and other entities based on the mapping of hosts and virtual IP addresses by router 200.

Kernel 243 may maintain one or more Address Resolution Protocol (ARP) tables 251 (also referred to as ARP caches). ARP tables 251 represents a data structure storing a plurality of address resolution entries each including a VRRP group ID from the virtual MAC address that to the target IP address in the ARP request message. The address resolution entries may also include a sender IP address representing the host that sent the ARP request message.

Forwarding engines 230 represent hardware and logic functions that provide high-speed forwarding of network traffic. Forwarding engines 230 typically includes a set of one or more forwarding chips programmed with forwarding information that maps network destinations with specific next hops and the corresponding output interface ports. In general, when PE device 200 receives a packet via one of inbound links 258, one of forwarding engines 230 identifies an associated next hop for the data packet by traversing the programmed forwarding information based on information within the packet. Forwarding engines 230 forwards the packet on one of outbound links 260 mapped to the corresponding next hop. In accordance with the techniques described in this disclosure, kernel 243 may generate forwarding information 256 to include representations of information stored to ARP tables 251 in the form of forwarding information for optimized forwarding by forwarding engines 30. For example, router 200 may determine a mapping of hosts-to-VRRP group identifier and store these group memberships in mapping table 262 of forwarding information 256. Forwarding engine 230 may use the mapping information of mapping table 262 to update header information of a packet. That is, forwarding engine 230 may replace a source MAC address 252 of a packet destined for a host based on the VRRP group to which the host is mapped.

In the example of FIG. 2, forwarding engine 230 includes forwarding information 256 having virtual MAC addresses 252 determined from the mapping of host devices to the VRRP group identifier. In accordance with routing information 242, forwarding engine 230 stores forwarding information 256 that maps packet field values to network destinations with specific next hops and corresponding outbound interface ports. For example, routing engine 238 analyzes routing information 242 and generates forwarding information 256 to forward packets using virtual source MAC addresses 252. Forwarding information 256 may be maintained in the form of one or more tables, link lists, radix trees, databases, flat files, or any other data structures.

Routing engine 238 includes a configuration interface 241 that receives and may report configuration data for router 200. Configuration interface 241 may represent a command line interface; a graphical user interface; Simple Network Management Protocol (SNMP), Netconf, or another configuration protocol; or some combination of the above in some examples. Configuration interface 241 receives configuration data configuring the router 200 and other constructs that at least partially define the operations for router 200. For example, an administrator may use configuration interface 241 to configure the VRRP group ID, the master router, the backup router, MAC source address filtering, etc. for router 200.

Routing engine 238 also includes a mapping module 261 to glean membership information of hosts and virtual routers from ARP request messages received from the host devices. The mapping module 261 may determine from a received ARP request a sender IP address of the host device from the ARP payload. Mapping module 261 may also extract a VRRP group identifier (an identifier for a group of virtual routers) from the virtual MAC address corresponding to the virtual IP address, which is contained in a target IP address field of the ARP message. Using the above information, mapping module 261 is able to determine a grouping of hosts-to-VRRP group identifier. Router 200 maintains these group memberships and dynamically updates the information in situations where the group membership changes. Router 200 may then use this information to decide on a source MAC address on a packet that is to be forwarded to the participating hosts or servers.

Figure 3:
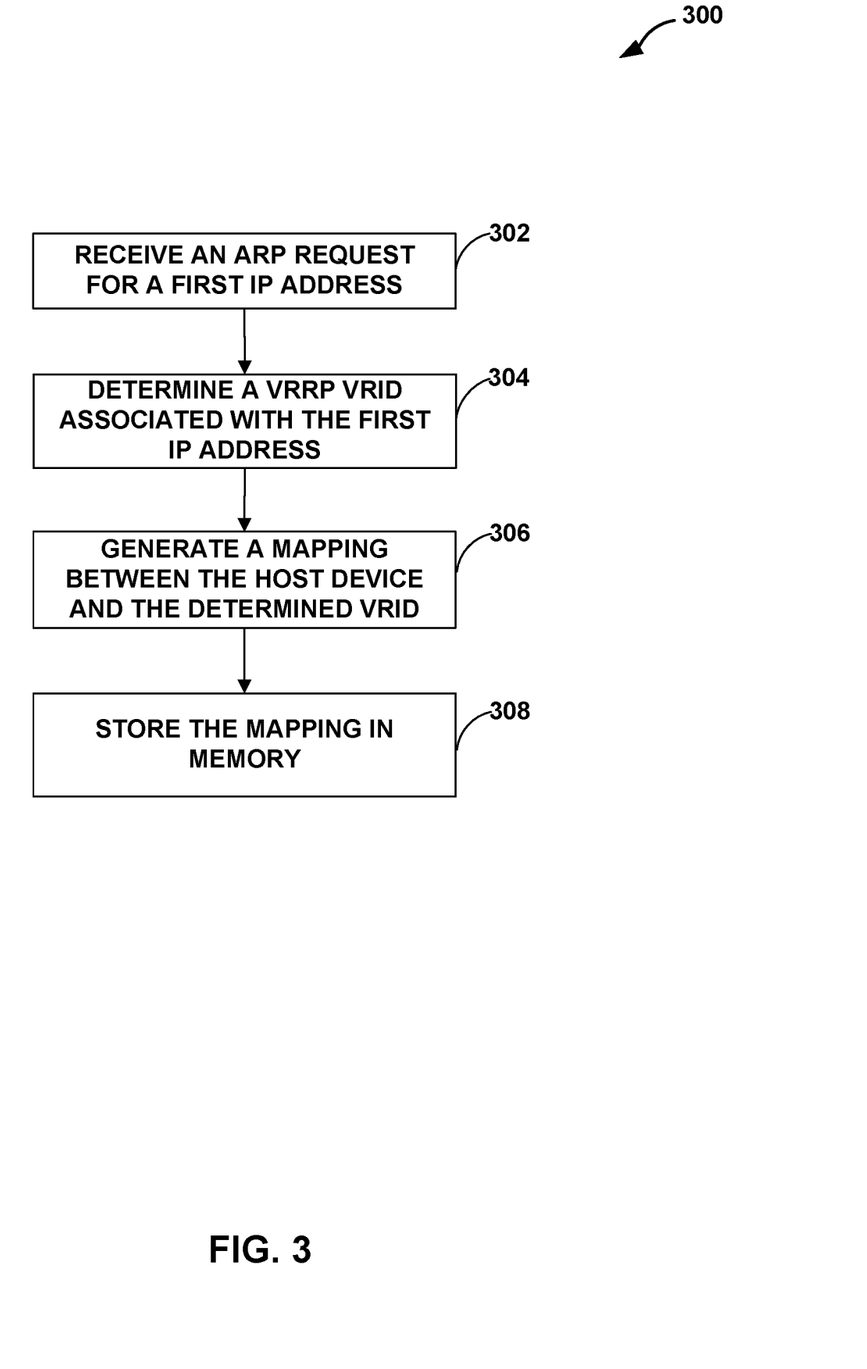
FIG. 3 is a flowchart illustrating an example operation of a router, according to techniques described herein.

FIG. 3 is a flowchart illustrating an example operation of a router for mapping hosts to virtual IP addresses that can be used to identify the source MAC address used while forwarding packets to the participating hosts or servers, according to techniques described herein. Operation 300 is described with respect to virtual router 107A of physical router 101 of FIG. 1, but may be performed by any virtual router. In some examples, physical router 101, operating as a virtual router (e.g., virtual router 107A), may receive an Address Resolution Protocol (ARP) request message for a first Internet protocol (IP) address from a host device, e.g., client device 105A (302). For example, host 105A may configure its default gateway address as the virtual IP address of router 101, e.g., IP A. Host 105A may send an ARP request for IP A. Virtual router 107A may receive the ARP request message that may include a first IP address representing the default gateway address that was configured as one of the virtual IP addresses of router 101.

Virtual router 107A of router 101 may determine a VRRP virtual router identifier (VRID) associated with the first IP address (304). As described above, virtual router 107 may extract the VRRP VRID from a virtual MAC address included in the target IP address (e.g., IP A) field of the received ARP request. In some examples, the virtual router 107A may determine from the received ARP request a sender IP address specifying an IP address of the host device.

Based on the extracted information, virtual router 107A may generate a mapping between the host device and the determined VRID (306). For example, virtual router 107A may map an IP address of the host device that sent the ARP request, e.g., host 105A, to the VRID associated with virtual router 107A. Physical router 101 may perform similar processes for each of hosts 105 as hosts 105 send ARP requests to physical router 101. Thus, multiple hosts 105 may be mapped to the same VRID, e.g., associated with virtual router 107A. Router 200 may store the mapping in memory (308).

Figure 4:
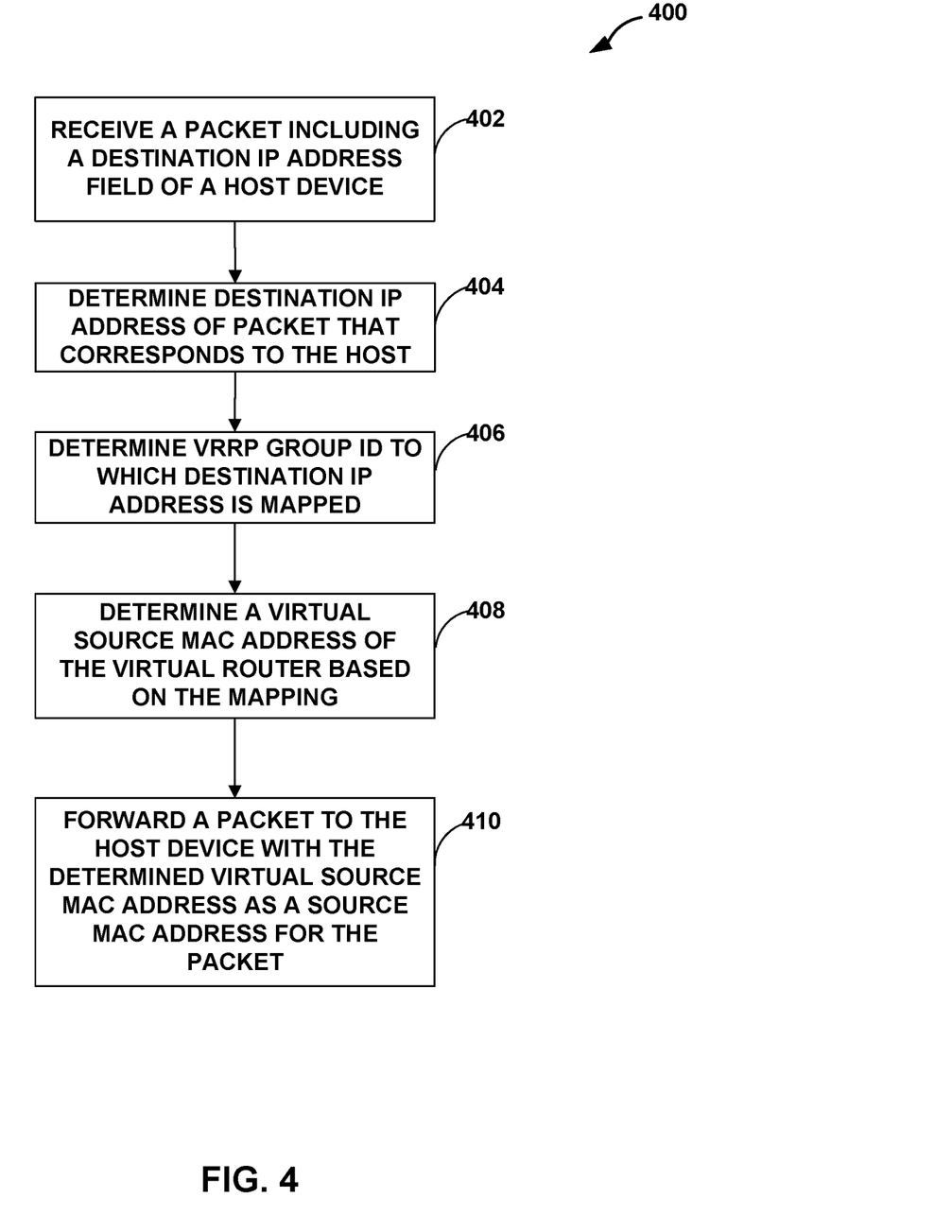
FIG. 4 is a flowchart illustrating an example operation of a router for forwarding packets to a host device with a determined virtual source MAC address as a source MAC address for the packet, according to the techniques described herein.

FIG. 4 is a flowchart illustrating an example operation of a router for forwarding packets to a host device with a determined virtual source MAC address as a source MAC address for the packet, according to the techniques described herein. Operation 400 is described with respect to virtual router 107A of physical router 101 of FIG. 1, but may be performed by any virtual router. In some examples, operation 400 provides additional operation to operation 300 of FIG. 3.

In some examples, physical router 101, operating as a virtual router (e.g., virtual router 107A), may receive a packet including a destination IP address field specifying an IP address of a host device (e.g., host device 105A) that sent the packet (402). Virtual router 107A may determine the destination IP address from the received packet that corresponds to the host device (404).

Virtual router 107A of router 101 may determine a VRRP group identifier (VRID) to which the destination IP address is mapped (406). As described above, virtual router 107 may extract the VRRP VRID from a virtual MAC address included in the target IP address (e.g., IP A) field of a received ARP request.

Virtual router 107A may determine a virtual source MAC address of the virtual router based on the mapping between the host device and the determined VRID (408). For example, virtual router 107A may determine the VRID associated with the IP address of the host device based on the mapping. Virtual router 107A may also determine based on the mapping the virtual source MAC address comprising a pre-determined byte address prefix and the VRID in a last byte of the virtual source MAC address.

Virtual router 107A may forward a packet to the host device that specifies the determined virtual source MAC address as a source MAC address for the packet (410). For example, the router may configure the "nexthop" pointing to the host address with the source MAC address based on the mapping of host 105A and the VRID associated with virtual router 107A. When virtual router 107A receives a packet to be forwarded to host 105A, router 107A determines the virtual source MAC address that is to be specified in the source MAC address field of the packet header based on the mapping. That is, virtual router 107A may update a source MAC address field of the data packet to specify the virtual source MAC address such that the packet will be properly filtered by access control lists.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects of the techniques have been described. These and other aspects are within the scope of the following claims.

What is claimed is:
1. A method comprising:
receiving, by a virtual router executing on a physical router, an Address Resolution Protocol (ARP) request for an Internet protocol (IP) address of a host device, the IP address comprising a virtual IP address of the virtual router;

determining, by the virtual router, a virtual router redundancy protocol (VRRP) virtual router identifier (VRID) associated with the IP address; and generating, by the virtual router, a mapping between the IP address of the host device and the determined VRID for forwarding packets to the host device;

receiving, by the virtual router, a first packet including a destination IP address field specifying the IP address of the host device;

determining, by the virtual router and based on the mapping, a virtual source MAC address of the virtual router that is based on the VRID associated with the IP address; and forwarding, by the virtual router, a second packet to the host device, the second packet specifying the determined virtual source MAC address as a source MAC address for the second packet, and the second packet including a payload of the first packet.

2. The method of claim 1, wherein determining the virtual source MAC address of the virtual router based on the mapping further comprises:

determining the virtual source MAC address comprising a pre-determined byte address prefix and the VRID in a last byte of the virtual source MAC address.

3. The method of claim 1, wherein forwarding the second packet to the host device further comprises:

updating a source MAC address field of the second packet to specify the virtual source MAC address.

4. The method of claim 1, further comprising:

updating a next hop field of forwarding information specifying the IP address of the host device as a destination IP address with the determined virtual source MAC address.

5. The method of claim 1, wherein the host device is configured with the IP address as a default gateway address.

6. The method of claim 1, further comprising executing a plurality of virtual routers, including the virtual router, in accordance with VRRP.

7. A network device comprising:

a memory;

one or more processors operably coupled to the memory, wherein the one or more processors are configured to execute a virtual router to:

receive an Address Resolution Protocol (ARP) request for an Internet protocol (IP) address from a host device, the IP address comprising a virtual IP address of the virtual router;

determine a virtual router redundancy protocol (VRRP) virtual router identifier (VRID) associated with the IP address;

generate a mapping between the IP address of the host device and the determined VRID for forwarding packets to the host device; and store the mapping in the memory;

receive a first packet including a destination IP address field specifying the IP address of the host device;

determine, based on the mapping, a virtual source MAC address of the virtual router that is based on the VRID associated with the IP address; and forward a second packet to the host device, the second packet specifying the determined virtual source MAC address as a source MAC address for the second packet, and the second packet including a payload of the first packet.

8. The network device of claim 7, wherein to determine the virtual source MAC address of the virtual router based on the mapping, the virtual router is further configured to:

determine the virtual source MAC address comprising a pre-determined byte address prefix and the VRID in a last byte of the virtual source MAC address.

9. The network device of claim 7, wherein to forward the second packet to the host device, the virtual router is further configured to:

update a source MAC address field of the second packet to specify the virtual source MAC address.

10. The network device of claim 7, wherein the virtual router is further configured:

update a next hop field of forwarding information specifying the IP address of the host device as a destination IP address with the determined virtual source MAC address.

11. The network device of claim 7, wherein the host device is configured with the IP address as a default gateway address.

12. The network device of claim 7, wherein the one or more processors are configured to execute a plurality of virtual routers, including the virtual router, in accordance with VRRP.

13. A non-transitory computer-readable storage medium comprising instructions for causing at least one programmable processor of a network device to execute a virtual router, wherein the instructions that cause the at least one programmable processor to execute the virtual router comprise instructions that cause the virtual router to:

receive an Address Resolution Protocol (ARP) request for a Internet protocol (IP) address of a host device, the IP address comprising a virtual IP address of the virtual router;

determine a virtual router redundancy protocol (VRRP) virtual router identifier (VRID) associated with the IP address; and generate a mapping between the IP address of the host device and the determined VRID for forwarding packets to the host device;

receive a first packet including a destination IP address field specifying the IP address of the host device;

determine, based on the mapping, a virtual source MAC address of the virtual router that is based on the VRID associated with the IP address of the host device; and forward a second packet to the host device, the second packet specifying the determined virtual source MAC address as a source MAC address for the second packet, and the second packet including a payload of the first packet.

14. The non-transitory computer-readable storage medium of claim 13, wherein the instructions to determine the virtual source MAC address of the virtual router based on the mapping further comprise instructions to:

determine the virtual source MAC address comprising a pre-determined byte address prefix and the VRID in a last byte of the virtual source MAC address.

15. The non-transitory computer-readable storage medium of claim 13, wherein the instructions to forward the second packet to the host device comprise instructions to:

update a source MAC address field of the data packet to specify the virtual source MAC address.

16. The non-transitory computer-readable storage medium of claim 13, further comprising instructions to:

update a next hop field of forwarding information specifying the IP address of the host device as a destination IP address with the determined virtual source MAC address.

17. The non-transitory computer-readable storage medium of claim 13, wherein the host device is configured with the IP address as a default gateway address.

18. The non-transitory computer-readable storage medium of claim 13, wherein the instructions that cause the at least one programmable processor to execute the virtual router comprise instructions that cause the at least one programmable processor to execute a plurality of virtual routers including the virtual router, in accordance with VRRP.

* * * * *